United States Patent
Li et al.

(10) Patent No.: US 10,236,098 B1
(45) Date of Patent: Mar. 19, 2019

(54) FIREPROOF CABLE WITH CERAMIFIED SILICONE RUBBER INSULATING SHEATH AND STAINLESS STEEL INTERLOCKED ARMOR

(71) Applicant: Zhejiang Zetastone Special Cable Co.,Ltd, Hangzhou, Zhejiang (CN)

(72) Inventors: Weigang Li, Zhejiang (CN); Zhaowen Yang, Zhejiang (CN)

(73) Assignee: Zhejiang Zetastone Special Cable Co., Ltd., Hangzhou (CN)

( * ) Notice: Subject to any disclaimer, the term of this patent is extended or adjusted under 35 U.S.C. 154(b) by 0 days.

(21) Appl. No.: 15/890,331

(22) Filed: Feb. 6, 2018

(30) Foreign Application Priority Data

Oct. 20, 2017 (CN) .......................... 2017 1 0982290

(51) Int. Cl.
| | | |
|---|---|---|
| H01B 7/00 | (2006.01) | |
| H01B 7/295 | (2006.01) | |
| H01B 7/02 | (2006.01) | |
| H01B 7/22 | (2006.01) | |
| H01B 7/04 | (2006.01) | |
| H01B 3/46 | (2006.01) | |

(52) U.S. Cl.
CPC .......... H01B 7/295 (2013.01); H01B 7/0009 (2013.01); H01B 7/02 (2013.01); H01B 7/04 (2013.01); H01B 7/22 (2013.01); H01B 3/46 (2013.01)

(58) Field of Classification Search
CPC .......... H01B 3/46; H01B 7/02; H01B 7/0009; H01B 7/295; H01B 7/04; H01B 7/22
USPC ................ 174/110 R, 113 R, 120 R, 120 AR
See application file for complete search history.

(56) References Cited

U.S. PATENT DOCUMENTS

| | | | | |
|---|---|---|---|---|
| 2002/0117325 | A1* | 8/2002 | Mennone ............... | H01B 7/295 174/121 A |
| 2006/0175075 | A1* | 8/2006 | Konnik ................... | H01B 3/46 174/110 R |
| 2014/0008098 | A1* | 1/2014 | Scaglione ............... | H01B 7/18 174/107 |

FOREIGN PATENT DOCUMENTS

| | | | | | |
|---|---|---|---|---|---|
| CN | 105895240 | A | * | 8/2004 | ............. H01B 7/04 |
| CN | 201853530 | U | * | 6/2011 | ............. H01B 9/02 |
| CN | 103745768 | A | * | 4/2014 | ............. H01B 7/02 |
| CN | 203760110 | U | * | 8/2014 | ............. H01B 7/04 |
| CN | 204792059 | U | * | 11/2015 | ............. H01B 7/04 |
| GB | 2488788 | A | * | 10/2008 | ............. H01B 7/295 |

* cited by examiner

Primary Examiner — William H. Mayo, III
(74) Attorney, Agent, or Firm — Wayne & Ken, LLC; Tony Hom

(57) ABSTRACT

A fireproof cable which has a ceramified silicone rubber insulating sheath and a stainless steel interlocked armor. The cable includes wire cores each having multiple flexible copper conductors, wherein each conductor is wrapped with a ceramified silicone rubber insulating layer. A ceramified silicone rubber sheath layer and a stainless steel interlocked armor protection layer are wrapped around the wire core successively.

9 Claims, 2 Drawing Sheets

: flexible copper conductor
: ceramified silicone rubber insulating layer
: ceramified silicone rubber sheath layer
: stainless steel interlocked armor protection layer

- : flexible copper conductor
- : ceramified silicone rubber insulating layer
- : ceramified silicone rubber sheath layer
- : stainless steel interlocked armor protection layer

FIREPROOF CABLE WITH CERAMIFIED SILICONE RUBBER INSULATING SHEATH AND STAINLESS STEEL INTERLOCKED ARMOR

TECHNICAL FIELD

The present invention relates to the technical field of cables and in particular to a fireproof cable with a ceramified silicone rubber insulating sheath and a stainless steel interlocked armor.

BACKGROUND OF THE PRESENT INVENTION

The wire & cable industry is the largest industry second to the automotive industry, with a variety richness and a market share in China of both over 90%. As one of the most important research and production bases for cable products all over the world, there have been a series of cable products with unique properties and special structures in China, for example, flame retardance, high/low temperature resistance, low inductance and low noise, green and environmental protection, low smoke zero halogen, resistance to termites and mouse, and water and moisture resistance, and such cable products have been produced in mass at high quality. With the increasing demands for safety guard and system security, special wire cable products with high performance and high efficiency and safety will be widely applied in systems in various industries by the extensive advertisement, promotion, and cooperation of the government, industries and enterprises, just like their applications in the developed countries.

To ensure the security of data, in case of fire, people wish they have enough time to collect all data and transfer them to somewhere secure, so as to minimize the possibility of data loss. Generally, the fireproof cables popular in the present market are produced by wrapping by mica tapes or filling MgO First, it is difficult to mount such cables processed with mica tapes or MgO. And, it is necessary to produce such cables in an absolutely dry environment to avoid failure of the cables. Once such cables are exposed to moisture, it is likely to result in breakdown between the conductors, which may cause the failed power transmission or even short-circuit to burn the whole cable. Furthermore, the cost of such cables is relatively high.

SUMMARY OF THE PRESENT INVENTION

An objective of the present invention is to provide a fireproof cable with a ceramified silicone rubber insulating sheath and a stainless steel interlocked armor, to solve the problems mentioned in the background.

For this purpose, the present invention employs the following technical solutions.

A fireproof cable with a ceramified silicone rubber insulating sheath and a stainless steel interlocked armor, comprising: cores each consisting of a plurality of flexible copper conductors each wrapped with a ceramified silicone rubber insulating layer, and a ceramified silicone rubber sheath layer and a stainless steel interlocked armor protection layer which wrap a wire core successively.

As a further technical solution of the present invention, the flexible copper conductors are conductors of category 5 with a flexible structure, in accordance with the GB/T3956 standard.

As a further technical solution of the present invention, the ceramified silicone rubber insulating layer is made of ceramified silicone rubber which is uniformly extruded on the flexible copper conductors.

As a further technical solution of the present invention, the ceramified silicone rubber insulating layer has a thickness of 1.6 mm.

As a further technical solution of the present invention, a wire core is a 3C+1C wire core having a pitch not greater than 16D, with back-twist and in 27.5 mm.

As a further technical solution of the present invention, four wire cores form a cable and the ceramified silicone rubber sheath layer is extruded on cable cores.

As a further technical solution of the present invention, the ceramified silicone rubber sheath layer has an average thickness of 4.2 mm.

As a further technical solution of the present invention, the stainless steel interlocked armor protection layer is a stainless steel strip interlocked armor, with an overlap of 25%. In the premise of ensuring the overlap, the stainless steel interlocked armor protection layer is closely adhered outside the ceramified silicone rubber to maintain the flexibility of the cable.

As a further technical solution of the present invention, the stainless steel interlocked armor protection layer has a thickness of 0.3 mm.

Compared with the prior art, the present invention has the following beneficial effects:

The fireproof cable of the present invention will be burned to a ceramic armor instead of powdery ash when in flame ablation at 950° C. for 180 min. A tough protection layer will be formed to protect the circuit against short-circuit or open-circuit, which is unachievable by common high polymer material, for example, common rubber or plastic material. At present, this process is mainly applied in the production of fireproof wires and cables. The produced fireproof wires and cables can ensure the smoothness of power lines and communication lines in case of fire, and have reached the indexes of the national standards. The present invention solves the unusable problem of the cable core when exposed to moisture, reduces the cost in use, decreases the construction difficulty of workers, maintains the characteristics of fireproof cables, and is clean and free of environmental pollution.

DETAILED DESCRIPTION OF THE PRESENT INVENTION

The technical solutions in the embodiments of the present invention will be clearly and completely described below with reference to the accompanying drawings in the embodiments of the present invention. Apparently, the embodiments described herein are merely a part but not all of the embodiments of the present invention. All other embodiments obtained by a person of ordinary skill in the art without any creative effort on the basis of the embodiments in the present invention shall fall into the protection scope of the present invention.

Embodiment 1

Figure 1:
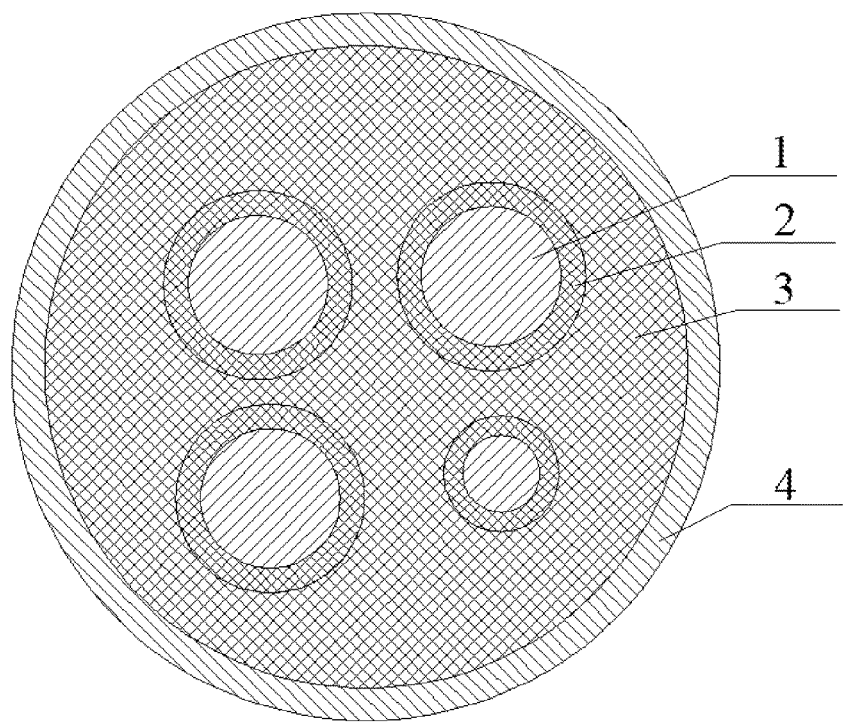
FIG. 1 is a structure diagram of the present invention.

Referring to FIG. 1, in an embodiment of the present invention, a fireproof cable with a ceramified silicone rubber insulating sheath and a stainless steel interlocked armor is provided, comprising: wire cores each consisting of a plurality of flexible copper conductors 1 each wrapped with a ceramified silicone rubber insulating layer 2, and a ceramified silicone rubber sheath layer 3 and a stainless steel interlocked armor protection layer 4 which wrap a wire core successively.

Model and specification: FH-TGGR 3C*50+1*25

Structure of the cable:

1) the flexible copper conductor 1: 3C*376/0.4 mm bare copper conductor with an outer diameter of 10.4 mm and 1C*192/0.4 mm bare copper conductor with an outer diameter of 7.1 mm;

2) the ceramified silicone rubber insulating layer 2: ceramified silicone rubber insulating layer outer diameter: 3C*13.6 mm and 1C*10.3 mm;

3) the formation of cables: 3C+1C wire cores having a pitch not greater than 16D, with back-twist and in 27.5 mm;

4) the ceramified silicone rubber sheath layer 3: extruded on cable cores to fill gaps between the cable cores, with an outer diameter of 36 mm; and 5) the stainless steel interlocked armor protection layer 4: 35*0.2 mm, an interlocked armor formed of stainless steel wrapping strips, tightly wound on the cables. The material of the stainless steel wrapping strips is ASTM304 or SUS304.

Figure 2:
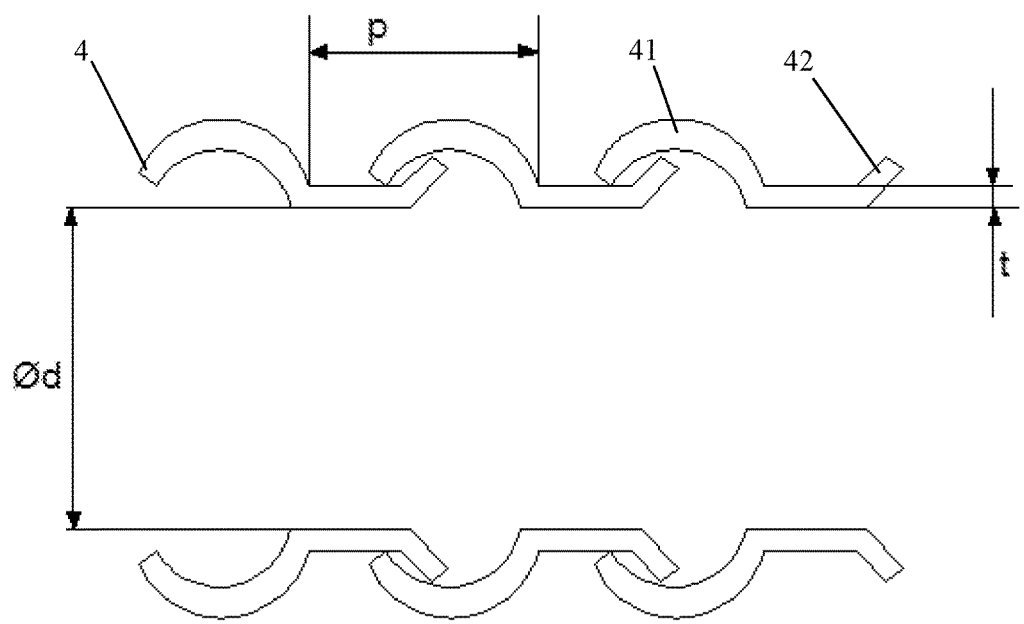
FIG. 2 is a structure diagram of a stainless steel interlocked armor protection layer according to the present invention,
in which:
1: flexible copper conductor
2: ceramified silicone rubber insulating layer
3: ceramified silicone rubber sheath layer; and
4: stainless steel interlocked armor protection layer.

Referring to FIG. 2, the stainless steel interlocked armor protection layer 4 is formed of a number of stainless steel wrapping strips connected end-to-end. A first end 41 of each of the stainless steel wrapping strips is arced and a second end 42 thereof is curled upward by 30° to 60°. The stainless steel wrapping strips are integrally molded, with the first end 41 of a later stainless steel wrapping strip covering the second end 42 of a previous stainless steel wrapping strip.

Electrical properties:

1) DC resistance: 3C≤0.386 Ω/km, 1C≤0.780;

2) insulation resistance: ≥5000 MΩ·km (20° C.);

3) dielectric strength: 50 Hz-0.67 kV 1 min, without breakdown;

4) service life: more than 50 years;

5) Environmental protection: conforming to RoHS; and 6) fireproof property: conforming to BS8791:2008<<Fire integrity assessment methods for large diameter power cables used as components of smoke and heat control systems and other specific fire safety systems>>.

1. The ceramified silicone rubber is substance that can be burned to a tough ceramic object at high temperature. The ceramified process of silicone rubber is a process of solidifying and binding the combustion products of silicone rubber, where the discrete, loose and discontinuous small inorganic particles can be tightly bonded together. Since the formation mechanism and the final product are similar to those of ceramic material, this material subjected to such a process is called ceramified silicone rubber. Such material has the advantages of ceramic material, for example, insulation, heat isolation, fireproofing, shock absorption, and low thermal weight loss.

2. The ceramified silicone rubber is non-toxic and odorless, highly soft and elastic, and excellent in moisture resistance and resistance to water absorption. The ceramified silicone rubber is burned to a tough ceramic armor shell in flame ablation after 2-4 min. An isolating layer formed by such a tough ceramic armor shell can quite effectively block the continuous combustion. And, no more smoke will be generated after about 2 min. In the subsequent ablation process, no more smoke will be generated. Even smoke generated in the first 2 min is halogen-free, non-toxic and harmless.

3. The ceramified silicone rubber is highly fireproof. Filling MgO can effectively protect the insulating wire cores against flame so that the smoothness of the lines is ensured. No fire will be caused even if short-circuit occurs.

Advantages:

1: excellent insulating property, which can reach the electrical properties of XLPE (cross-linked polyethylene);

2: excellent high/low temperature resistance, long-term working temperature ranging from −70° C. to 200° C., long service life up to 50 years depending on specific environmental conditions, hardened over 350° C., and suitable for long-term use in static environments;

3. resistant to ozone aging and UV aging, free of anti-ageing agents and antioxidants, and long service life up to 50 years at normal temperature;

4. special surface properties, extremely low moisture absorption and water absorption (0.17%), and good mildew resistance;

5. environmentally-friendly, halogen-free, free of heavy metals, non-toxic, odorless, and harmless to both the human body and the environment;

6. high chemical corrosion resistance, waterproof and oil resistance;

7. good processing performance, ease of mixing, molding, calendaring and extruding, and good rubber fluidity; and 8. lowest level of fume, smoke and toxicity of the ceramified silicone rubber, among the high polymer materials at present.

The ceramified silicone rubber cable can be burned to a tough ceramic object at high temperature, and a tough ceramic armor will be formed to ensure the smoothness of the lines. This is the most revolutionary feature of the ceramified silicone rubber cable. The ceramic armor will be tougher at a higher temperature for a longer ablation period.

It is apparent for those skilled in the art that the present invention is not limited to details of the above exemplary embodiments, and the present invention can be embodied in other specific forms without departing from the spirit or essential features of the present invention. Therefore, the embodiments shall be considered to be exemplary and non-limiting from all aspects. The scope of the present invention is defined by the appended claims, not by the above description. It is intended to encompass all variations falling into the meaning and scope of the equivalences of the claims into the present invention.

In addition, it should be understood that not every implementation contains only one independent technical solution although the description has been illustrated by implementations. This narration way of the description is merely for clarity. Those skilled in the art shall consider the description as a whole. The technical solutions in the embodiments may also be combined if appropriate to form other implementations that can be understood by those skilled in the art.

What is claimed is:

1. A fireproof cable with a ceramified silicone rubber insulating sheath and a stainless steel interlocked armor, comprising:

wire cores each consisting of a plurality of flexible copper conductors each wrapped with a ceramified silicone rubber insulating layer, a ceramified silicone rubber sheath layer and a stainless steel interlocked armor protection layer; wherein the ceramified silicone rubber insulating layer is wrapped by the ceramified silicone rubber sheath layer, and the ceramified silicone rubber sheath layer is wrapped by the stainless steel interlocked armor protection layer;

the stainless steel interlocked armor protection layer is formed of a number of stainless steel wrapping strips connected end-to-end; a first end of each of the stainless steel wrapping strips is arched and a second end thereof is curled upward by 30° to 60°, the stainless steel wrapping strips are integrally molded, with the first end of a later stainless steel wrapping strip covering the second end of a previous stainless steel wrapping strip.

2. The fireproof cable with a ceramified silicone rubber insulating sheath and a stainless steel interlocked armor according to claim 1, wherein the flexible copper conductors are conductors of category 5 with a flexible structure.

3. The fireproof cable with a ceramified silicone rubber insulating sheath and a stainless steel interlocked armor according to claim 1, wherein the ceramified silicone rubber insulating layer is made of ceramified silicone rubber which is uniformly extruded on the flexible copper conductors.

4. The fireproof cable with a ceramified silicone rubber insulating sheath and a stainless steel interlocked armor according to claim 1, wherein the ceramified silicone rubber insulating layer has a thickness of 1.6 mm.

5. The fireproof cable with a ceramified silicone rubber insulating sheath and a stainless steel interlocked armor according to claim 1, wherein a wire core is a 3C+1C wire core having a pitch not greater than 16D, with back-twist and in 27.5 mm.

6. The fireproof cable with a ceramified silicone rubber insulating sheath and a stainless steel interlocked armor according to claim 1, wherein four wire cores form a cable and the ceramified silicone rubber sheath layer is extruded on cable cores.

7. The fireproof cable with a ceramified silicone rubber insulating sheath and a stainless steel interlocked armor according to claim 1, wherein the ceramified silicone rubber sheath layer has an average thickness of 4.2 mm.

8. The fireproof cable with a ceramified silicone rubber insulating sheath and a stainless steel interlocked armor according to claim 1, wherein the stainless steel interlocked armor protection layer is a stainless steel strip interlocked armor, with an overlap of 25%.

9. The fireproof cable with a ceramified silicone rubber insulating sheath and a stainless steel interlocked armor according to claim 1, wherein the stainless steel interlocked armor protection layer has a thickness of 0.3 mm.

* * * * *